(12) United States Patent
Oertel et al.

(10) Patent No.: US 6,450,017 B2
(45) Date of Patent: Sep. 17, 2002

(54) METHOD FOR DETECTING COMBUSTION MISFIRES IN A MULTI-CYLINDER INTERNAL COMBUSTION ENGINE

(75) Inventors: Heiko Oertel, Stuttgart-Weilimdorf; Andrea Lohmann, Stuttgart; Juergen Schwabe, Leinfelden-Echterdingen; Ralf Schnee, Eberdingen; Uwe Buck, Esslingen; Peter Wiltsch, Wimsheim; Heinz Viel, Kaisersbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 09/759,459

(22) Filed: Jan. 16, 2001

(30) Foreign Application Priority Data

Jan. 14, 2000 (DE) .......................... 100 01 283

(51) Int. Cl.7 ............................................. G01M 15/00
(52) U.S. Cl. ..................................................... 73/117.3
(58) Field of Search ....................... 73/16, 117.2, 117.3, 73/118.1; 340/438, 439, 441; 701/101, 110, 111

(56) References Cited

U.S. PATENT DOCUMENTS

| | | | | | |
|---|---|---|---|---|---|
| 5,753,804 | A | * | 5/1998 | La Palm et al. | 123/436 |
| 5,893,042 | A | * | 4/1999 | Lohmann et al. | 123/479 |
| 6,155,105 | A | * | 12/2000 | Klenk et al. | 340/441 |

* cited by examiner

Primary Examiner—Eric S. McCall
(74) Attorney, Agent, or Firm—Walter Ottesen

(57) ABSTRACT

The invention relates to a method for detecting combustion misfires in a multi-cylinder internal combustion engine. Combustion misfires are detected from data for the rough running of individual cylinders via a comparison with threshold values at operating points stored in a characteristic field. These data are determined within the engine. The combustion misfire detection is suppressed below an rpm-dependent zero-load characteristic line. The zero-load characteristic line is continuously adapted to the actually present lowest load at corresponding rpm values during vehicle operation.

4 Claims, 1 Drawing Sheet ion METHOD FOR DETECTING COMBUSTION
MISFIRES IN A MULTI-CYLINDER
INTERNAL COMBUSTION ENGINE

BACKGROUND OR THE INVENTION

Methods for detecting combustion misfires in multi-cylinder internal combustion engines are known from the state of the art wherein combustion misfires are detected from data for the rough running of individual cylinders, which are determined in the engine, via a comparison to threshold values at operating points stored in a characteristic field. The threshold values are usually stored in a characteristic field for individual operating points of the engine. Combustion misfires below an rpm-dependent zero-load characteristic line are suppressed.

The methods are essentially based on detecting combustion misfires from values for the rough running of individual cylinders of the engine by a comparison to fixed threshold values in that the determined rough-running values exceed the threshold value. The values are determined internally in the engine.

The rough-running values for individual cylinders, which are decisive for the detection of misfires, are obtained while using the realization that a combustion within a cylinder of an engine, which does not take place or does take place only incompletely, is associated with characteristic changes of the torque trace of the engine compared to the normal operation. One can distinguish between normal operation of the engine without misfires and operation subjected to misfires from the comparison of the torque traces, that is, the amount which individual cylinders contribute to the torque. The differences in the torque trace are determined by determining segment times. Here, consideration is given to the situation that a torque contribution, which is lower as a consequence of an occurring misfire, is associated with a lengthening of the segment times of the crankshaft. The respective piston movement of individual cylinders during the torque producing expansion phase corresponds to a crankshaft segment. The rough-running values of individual cylinders are determined in a manner known per se from the measured segment times and are compared to the above-mentioned threshold values in a follow-on method step. Such methods for detecting combustion misfires have been proven in principle and are applied in the positive load range of the engine above a so-called zero-load characteristic line. Below the zero-load characteristic line, which is individually fixed for each vehicle engine, the combustion misfires are suppressed. In the determination of the decisive zero-load characteristic line, it should be considered that, for specific engine systems (for example, λ=1 systems), the load data are dependent upon external conditions. The ambient pressure and therefore the counterpressure which opposes the exhaust gas are considered as external conditions.

Furthermore, it has been shown in practice that in the rpm region close to idle, the zero-load level can fluctuate slightly from vehicle to vehicle.

From these conditions, the problematic results that a detection of a combustion misfire in the region of the zero characteristic line is suppressed, under some circumstances, too early or too late.

SUMMARY OF THE INVENTION

In view of the problematic referred to above, the method of the invention affords the advantage that a precise zero-load characteristic line is determined for all operating states by adapting the zero-load characteristic line during vehicle operation continuously to the actually present lowest loads at corresponding rpm values so that the combustion misfire detection is always active in the statutorily prescribed regions and an incorrect detection because of a defective suppression cannot occur.

Because of the continuous monitoring of the zero-load level, vehicle specific differences as well as differences in ambient pressure can also be considered. The differences in ambient pressure can occur, for example, because of different levels of elevation.

A preferred configuration of the method of the invention provides that actual load values rl are measured for actual rpm points and are compared to the zero-load values $rl_K$ determined from the stored characteristic line. A dropping of the load values rl below the zero-load values $rl_K$ effects an assumption of the load values rl into the characteristic line values. In this way, and via simple structural measures within an engine management system, the zero-load characteristic line can be applied for the lowest load points. The zero-load values of the characteristic line can be adapted in the direction of the actually occurring low loads via corresponding filtering.

The region of the zero-load characteristic line is seldom touched at high rpms. For this reason, it has furthermore been shown to be advantageous that, for low rpms (preferably in the idle range) a difference $\Delta rl=(rl-rl_K)$ is determined from a comparison of the measured zero-load values rl with the zero-load values $rl_K$ determined from the characteristic line; and, from this difference $\Delta rl$, for higher rpms, a corrected zero-load value $rl_{NEW}=(rl_K+\Delta rl)$ is determined which is taken into the zero-load characteristic line. In this way, the difference of the actual load values, which is present in idle, to the characteristic line load values is considered for the entire rpm range. However, a condition precedent for the application is that it must be made certain that additional consumers within a motor vehicle, which could lead to a higher idle rpm level, are disabled during the determination of the actual zero-load values rl. Furthermore, for specific application purposes, it can be advantageous to utilize the determined difference $\Delta rl$ from the idle level only at a fixed percentage for the new determination of the zero-load characteristic line.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
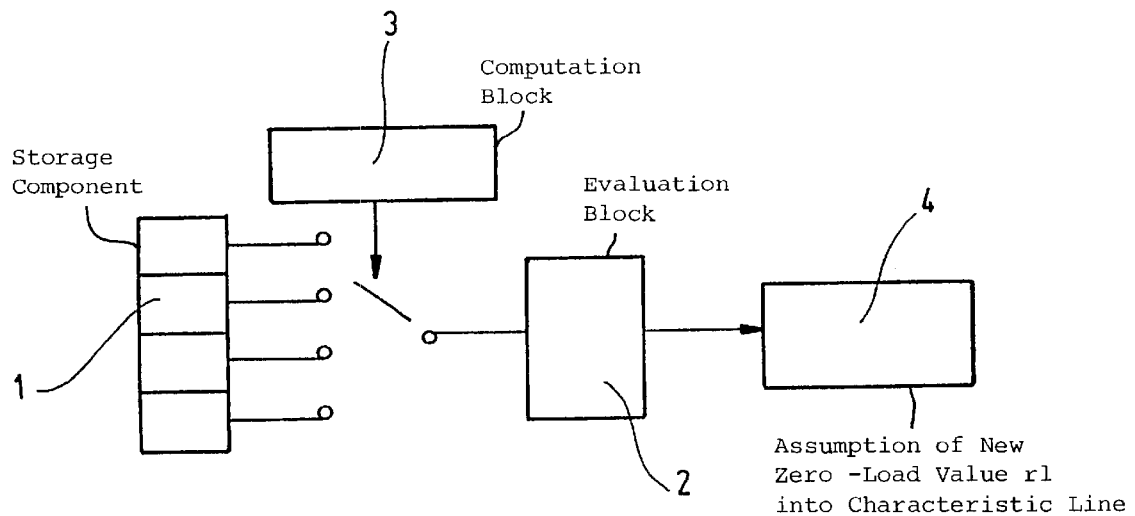
FIG. 1 is a block circuit diagram for the method sequence for checking and adapting the zero-load characteristic line to actually existing operating conditions; and, FIG. 2 is a block circuit diagram of a second embodiment of the method of the invention with adaptation of the zero-load characteristic line in idle and the assumption of the results to higher rpm levels.

In FIG. 1, block 1 represents a storage component wherein the characteristic field of the originally applied zero-load characteristic line having the characteristic line zero-load values $rl_K$ is stored in dependence upon rpm. The method of the invention determines actual zero-load values rl in dependence upon specific actual rpm points. These actual zero-load values rl are compared in an evaluation block 2 with the zero-load values $rl_K$ resulting from the zero-load characteristic line in dependence upon the actual rpm (u). If this comparison yields that the actual zero-load values rl are less than the values $rl_K$ from the characteristic line and if a several-time check also yields the same result, then, for the corresponding rpm point, the newly determined actual zero-load value rl is taken over into the characteristic line. This takes place in a separate unit 4.

Figure 2:
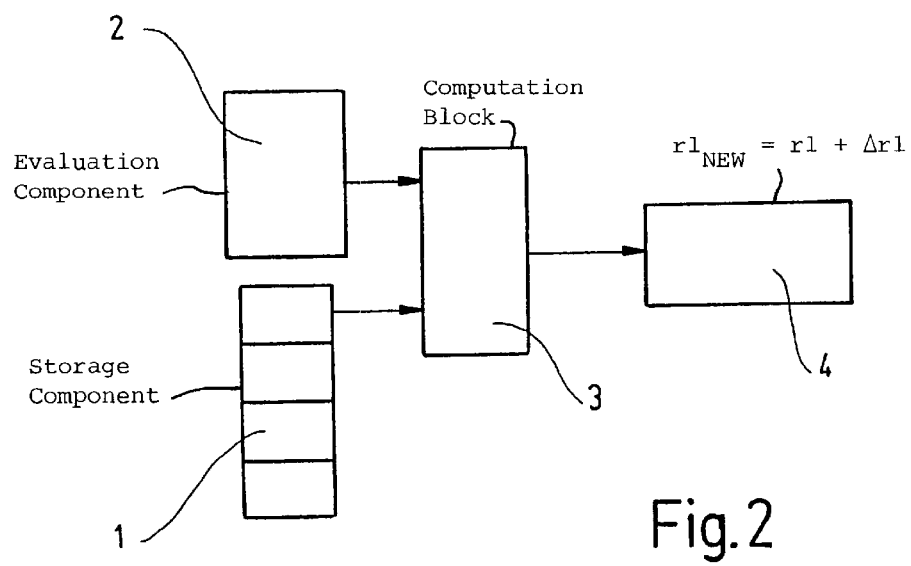

If, in practice, it is shown that, for specific rpm points (especially in higher rpm ranges), the zero-load region is seldom touched, then an adaptation of the actual zero-load values to the originally present zero-load characteristic line can be carried out via the embodiment shown in FIG. 2 also for this application.

The starting point of the method is, as in the first embodiment, a block 1 wherein the zero-load characteristic line is applied in the context of a characteristic line field. In the same manner as in the embodiment of FIG. 1, an actual zero-load value rl is determined in the additional embodiment of the method of the invention. The determination of this value takes place at idle rpm of the engine. Simultaneously, it must be ensured that additional consumers, which increase the idle load level, are disabled. The actual zero-load values rl are compared to the zero-load value $rl_K$ in an evaluation component 2 in the same manner as the method of FIG. 1. The zero-load value $rl_K$ is obtained from the zero-load characteristic line. Should it occur that the actually determined zero-load value rl is less than the value $rl_K$, which is determined from the characteristic line, then, in an additional method step, a difference value $\Delta rl$ is formed in computation block 3. The difference value $\Delta rl$ results from the equation:

$$\Delta rl = rl - rl_K.$$

If the comparison between the actual zero-load values rl and the values $rl_K$, which are determined from the characteristic line, shows over a certain time span that the actual zero-load values rl are continuously less than the values $rl_K$ which are pregiven by the zero-load characteristic line, then in a unit 4, a new zero-load value $rl_{NEW}$ is fixed as the sum of the characteristic line zero-load value rl and the computed difference $\Delta rl$ as:

$$rl_{NEW} = rl + \Delta rl.$$

This determination of the new zero-load value rl takes place for all zero-load characteristic values lying above the idle rpm level so that a corrected zero-load characteristic line results. For specific cases of application, it can be advantageous not to utilize the entire difference value $\Delta rl$ for the determination of the new zero-load value $rl_{NEW}$ but to use only a specific percentage of the value determined for $\Delta rl$.

The decision as to which percentage is used for the new computation is fixed by the engine developer in dependence upon given conditions.

It is understood that the foregoing description is that of the preferred embodiments of the invention and that various changes and modifications may be made thereto without departing from the spirit and scope of the invention as defined in the appended claims.

What is claimed is:

1. A method for detecting combustion misfires in a multi-cylinder internal combustion engine, the method comprising the steps of:

detecting misfires from data, which are determined in the engine, for the rough running of individual cylinders, by comparing said data to threshold values at operating points stored in a characteristic field;

suppressing the detection of combustion misfires below an rpm-dependent zero-load characteristic line; and, continuously adapting said zero-load characteristic line to the actually present lowest load at corresponding rpm values during operation of the vehicle.

2. The method of claim 1, comprising the further steps of:

measuring actual load values (rl) for actual rpm points and comparing said actual load values to zero-load values ($rl_K$) determined from the stored characteristic line; and, effecting an assumption of said load values (rl) into the characteristic line values when said load values drop below zero-load values ($rl_K$).

3. The method of claim 2, comprising the further steps of:

for low rpms including the idle range, determining a difference $$\Delta rl = rl - rl_K$$

when comparing the measured load values (rl) to the zero-load values ($rl_K$) determined from the characteristic line; and, with said zero-load value ($rl_K$), determining from said difference ($\Delta rl$) for higher rpms a corrected zero-load value ($rl_{NEW} = rl_K + \Delta rl$), which is taken into said zero-load characteristic line.

4. The method of claim 3, comprising the further step of forming said corrected zero-load value ($rl_{NEW}$) from said characteristic line zero-load value ($rl_K$) and a component quantity of the computed difference ($\Delta rl$).

* * * * *